3,114,731
PROCESS FOR CURING POLYEPOXIDES WITH ANHYDRIDES AND ORGANIC SULFUR COMPOUNDS
Gottfried E. Rumscheidt and Pieter Bruin, both of Amsterdam, Netherlands, assignors to Shell Oil Company, a corporation of Delaware
No Drawing. Filed Oct. 5, 1956, Ser. No. 614,075
Claims priority, application Netherlands Oct. 11, 1955
8 Claims. (Cl. 260—47)

This invention relates to a process for curing polyepoxides. More particularly, the invention relates to a new process for curing polyepoxides with acid anhydrides using a special class of activators for the acid anhydrides, and to the resulting cured products.

Specifically, the invention provides a new process for curing and resinifying polyepoxides, and preferably the glycidyl polyethers and polyesters, which comprises mixing and reacting the polyepoxide with a carboxylic acid anhydride in the presence of an activator for the composition comprising a sulfur compound of the group consisting of hydrogen sulfide, mercaptans, organic sulfides, organic sulfoxides and heterocyclic sulfur-containing compounds. The invention further provides cured products obtained by the above-described process which are characterized by their excellent hardness and durability.

It is known that acid anhydrides may be used by themselves as curing agents for such polyepoxide resins as the glycidyl polyethers of polyhydric phenols. When used by themselves, however, the anhydrides have certain undesirable properties which have placed a considerable limitation on their commercial utilization as curing agents for these polyepoxides. It has been found, for example, that the activity of the acid anhydrides in the cure of glycidyl polyethers is manifested only at relatively high temperatures. This prevents their use in the preparation of compositions that are to be cured at low temperatures or compositions that might be injured by the high temperatures. Even at the high reaction temperatures, the anhydrides in many cases act very slowly and they cannot be used in compositions which must be cured rapidly. Furthermore, the products obtained by the use of the anhydrides are sometimes deficient, particularly as to color, hardness and durability.

It is an object of the invention to provide a new method for curing polyepoxides. It is a further object to provide a new process for curing polyepoxides using acid anhydrides and a special class of activators for the composition. It is a further object to provide a new process for curing polyepoxides that may be used at comparatively low temperatures. It is a further object to provide a process for curing polyepoxides that gives a rapid rate of cure at elevated temperatures. It is a further object to provide a method for curing polyepoxides that gives cured products having excellent hardness and durability. These and other objects of the invention will be apparent from the following detailed description thereof.

It has now been discovered that these and other objects are accomplished by the process of the invention comprising mixing and reacting the polyepoxide with a carboxylic acid anhydride and an activator for the composition comprising a sulfur compound selected from the group consisting of hydrogen sulfide, and organic mercaptans, sulfides and sulfoxides. It has been found that when the anhydrides are used in combination with the above-noted activators they display surprisingly high activity as curing agents for the polyepoxides, over a wide range of temperatures. This combination, for example, gives excellent cure of the polyepoxides at or about temperatures as low as 60° C. and does so without the liberation of large amounts of heat. The combination is thus well suited for use in the preparation of low temperature cure surface coatings and moldings and castings where a low exotherm is required. At the higher temperatures, the combination of anhydride and activator gives a very rapid rate of cure and is particularly suited for use in the preparation of rapid cure high temperature enamels and paints such as may be used on assembly lines. Additional advantage is also found in the fact that the products obtained by the use of the activators are greatly improved in hardness and durability.

The acid anhydrides used as the curing agent in the process of the invention may be any anhydrides derived from polycarboxylic acids which possess at least one anhydride group, i.e., a group having the

saturated configuration. The carboxylic acids used in the formation of the anhydrides may be saturated, unsaturated, aliphatic, cycloaliphatic, aromatic or heterocyclic. Examples of these anhydrides include, among others, phthalic anhydride, isophthalic anhydride, di-, tetra- and hexahydrophthalic anhydride, 3,4,5,6,7,7-hexachloro-3,6-endomethylene 1,2,3,6 - tetrahydrophthalic anhydride (chlorendic anhydride), succinic anhydride, maleic anhydride, chlorosuccinic anhydride, monochlormaleic anhydride, 6-ethyl-4-cyclohexadiene-1,2-dicarboxylic acid anhydride, 3,6 - dimethyl-4-cyclohexadiene-1,2-dicarboxylic acid anhydride, 6-butyl-3,5-cyclohexadiene-1,2-dicarboxylic acid anhydride, octadecylsuccinic acid anhydride, dodecylsuccinic acid anhydride, dioctylsuccinic anhydride, nonadecadienylsuccinic anhydride, 3 - methoxy - 1,2,3,6-tetrahydrophthalic acid anhydride, 3-butoxy-1,2,3,6-tetrahydrophthalic anhydride, pyromellitic anhydride, di, tetra, and hexahydropyromellitic anhydride, polyadipic acid anhydride, polysebacic acid anhydride, and the like, and mixtures thereof.

Especially preferred anhydrides are the normally liquid or low melting anhydrides, such as hexahydrophthalic anhydride.

The activator for the composition comprises the sulfur compounds selected from the group consisting of hydrogen sulfide, an organic compound having at least one thiol radical, an organic sulfide, an organic sulfoxide, and an organic heterocyclic compound wherein sulfur and carbon are the only ring constituents. These compounds thus include not only hydrogen sulfide and the alkyl, alkenyl, aryl, aralkyl and cycloalkyl mercaptans, sulfides and sulfoxides but also heterocyclic compounds in which the sulfur atom is included in one or more rings. Examples of these sulfur compounds include mercaptans, such as methanethiol, thiocyclohexane and thiophenol; sulfides, such as ethylene sulfide, diphenyl sulfide and phenyl methyl sulfide; sulfoxides, such as di-n-butyl sulfoxide and diphenyl sulfoxide; and such heterocyclic compounds as thiophene, thiophthene, thianaphthene and thiophane.

Also useful are organic compounds having more than one reactive mercapto —SH groups. These compounds, referred to as polythiols for brevity, are exemplified by 1,5-pentanedithiol; 1,4-butanedithiol; 1,4-cyclohexanedithiol; 1,2,4-butanetrithiol; dimercapto diethyl formal (HSC$_2$H$_4$OCH$_2$OC$_2$H$_4$SH); 1,7-decanedithiol; 3,3'-thiodipropanethiol, 4,4'-thiodihexanethiol, 3,3'-oxydipropanethiol; 4,6-dithio-1,8-decandithiol, 4,6-disulfonyl-1,8-octanedithiol; 4-hydroxy-1,6-octanedithiol; 1,6-octenedithiol; HSSH; 1,3-benzenedithiol, 1,3,5-benzenetrithiol; 2-chloro-1,5-benzenedithiol; tetrahydropyran-2,3-dipropanethiol; 4,5-dihydrofuran-2,5 - dibutanethiol; sulfolane-2,5-dihexanethiol, furan - 2,5-dibutanethiol; 3 - hydroxy-dihydropyran-2,5-dioctenethiol and the like.

According to the process of the invention, the polyepoxide is cured by admixing and reacting the above-described anhydrides and activators with the polyepoxide. The amount of the anhydride to be used in the process will vary over a wide range. Good cures are obtained by reacting the polyepoxide with from 10–80% by weight of the polyepoxide, of the anhydride. For best results, the amount of anhydride used should be from 10% to 50% by weight of the polyepoxide.

The sulfur compound activators noted above are needed only in comparatively small amounts. Good results are obtained when the sulfur compound is used in amounts varying from 0.02 to 10% by weight of the polyepoxide, and excellent results can be achieved by using 0.02–5% by weight, on the same basis. Quantities of between around 0.02% to 2% by weight, based on the polyepoxide are particularly preferred.

The anhydride and sulfur compound activator may be together before they are added to the polyepoxide or they may be added separately.

In executing the process of the invention, it is desirable to have the polyepoxide in a mobile liquid condition when the anhydride and activator are added, in order to facilitate mixing. With those polyepoxides that are liquid, but too viscous for ready mixing, one may either heat the material to reduce its viscosity or add a liquid solvent thereto in order to provide fluidity. Normally solid polyepoxides are likewise either melted or mixed with a liquid solvent. Various solvents are suitable for achieving the desired fluidity. They may be volatile solvents which escape from the polyepoxide composition containing the anhydride-sulfur-compound mixture by evaporation before or during the curing, such as ketones like acetone, methyl ethyl ketone, methyl isobutyl ketone, isophorone, etc.; esters such as ethyl acetate, butyl acetate, Cellosolve acetate (ethylene glycol monoacetate), methyl Cellosolve acetate (acetate of ethylene glycol monomethyl ether), etc.; ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons, such as benzene, toluene, xylene, etc. and/or alcohols, such as ethyl, isopropyl or n-butyl alcohol. Solvents which remain in the cured composition may also be used, such as diethyl phthlalate, dibutyl phthalate, or liquid monoepoxy compounds, including glycidyl allyl ether, glycidyl phenyl ether, styrene oxide, 1,2-hexylene oxide, glycide, and the like, as well as cyano-substituted hydrocarbons, such as acetonitrile, propionitrile, adiponitrile, benzonitrile, and the like. It is also convenient to employ the solid or semisolid polyepoxides in combination with a liquid polyepoxide, such as a normally liquid glycidyl polyether of a polyhydric alcohol. Various other ingredients may be mixed with the polyepoxide composition including pigments, fillers, dyes, plasticizers, resins, and the like.

The cure may be effected over a wide range of temperatures. As has been indicated, the above-described anhydride-activator combinations are active at comparatively low temperatures such as about 60° C., and the cure may be achieved by mixing the anhydride and sulfur compound activator with the polyepoxide and raising the temperature of the mixture to about this level. Excellent rates of cure are obtained at slightly higher temperatures, between about 110° C. to 170° C., and these are preferred for many applications where heating to such temperatures is permissible. Temperatures much above 200° C. are generally not desirable but may be employed if necessary.

The curing agent-polyepoxide systems described above may be utilized for a great variety of important applications. Because of their low temperature cure properties, they are particularly useful in the preparation of low temperature cure coating compositions, and because of their rapid high temperature cures are useful in the formation of baking enamels and paints. In these applications, it is generally desirable to combine the polyepoxide with the anhydride and sulfur compound activator and desired solvents or other film-forming materials, and then apply this mixture to the surface to be coated. The coatings may then be allowed to set at the curing temperature.

The systems described above are also very useful in the preparation of pottings and castings. They are particularly suitable for preparing very large castings which can be cured at relatively low temperatures. In this application, the mixture of polyepoxide, anhydride and activator alone or with suitable diluents is added to the desired mold or casting and then allowed to set at the casting temperature selected.

The above-described systems are also useful in the preparation of laminates. In this application, the sheets of fibrous materials are first impregnated with the mixture of polyepoxide, anhydride and activator. This is conveniently accomplished by dissolving the anhydride and sulfur compound in acetone and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at low temperature, about 60° C., it is preferred to use somewhat elevated temperature such as about 110° C. to 200° C. with the impregnated sheet stock passing through or hanging free in an oven or other suitable equipment. The resinification is arrested before infusible product occurs by cooling below about 40° C. A plurality of the impregnated sheets are then superposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, paper, asbestos paper, mica flakes, cotton bats, duck muslin, canvas, and the like. It is usually preferred to utilize woven glass cloth that has been given prior treatment with well known finishing or sizing agents, therefor, such as chrome methacrylate or vinyl trichlorosilane.

In the above applications, the resulting cured products are characterized by their excellent hardness, durability and good water resistance, as well as by lack of discoloration which accompanies many of the other anhydride cured systems.

The polyepoxides to be cured by use of the above anhydrides may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type will be described throughout the specification and claims in terms of an epoxy equivalency. The term "epoxy equivalency" refers to the average number of epoxy groups (i.e.,

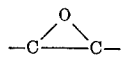

groups) contained in the average molecule. This value is obtained by dividing the average molecular weight of the polyepoxide by the epoxide equivalent weight. The epoxide equivalent weight is determined by heating a one gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyepoxide material consists of a single compound and all of the epoxy groups are intact the epoxy equivalency will be integers, such as 2, 3, 4, and the like. However, in the case of polymeric-type polyepoxides many of the materials may contain some of the monomeric monoepoxides or have some of their epoxy groups hydrated or otherwise reacted and/or contain macromolecules of somewhat different molecular weight so the epoxy equivalency may be quite low and containing fractional values. The polymeric material may, for example, have an epoxy equivalency of 1.5, 1.8, 2.5 and the like. The polyepoxides used in the invention have an epoxy equivalency greater than 1.0.

The polyepoxides which may be used with the curing agents of this invention embrace both those polyepoxide compounds having the terminal epoxy groups

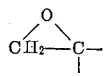

and those having the internal epoxy groups

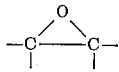

The first type of polyepoxides is exemplified by such compounds as the polyglycidyl ethers, and in particular the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane, 2,2-bis(4-hydroxy-phenol) butane, 4,4'-dihydroxybenzophenone, bis-4-hydroxyphenyl ethane, 2,2-bis(4-hydroxyphenyl) pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula

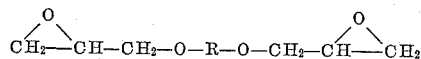

wherein R represents a divalent hydrocarbon radical of the dihydric phenol. The polymeric products will generally not be a single simple molecule but will be a complex mixture of glycidyl polyethers of the general formula

wherein R is a divalent hydrocarbon radical of the dihydric phenol and $n$ is an integer of the series 0, 1, 2, 3 etc. While for any single molecule of the polyether $n$ is an integer, the fact that the resultant polyether is a mixture of these molecules causes the determined value for $n$ to be an average which is not necessarily zero or a whole number. The polyethers may in some cases contain a very small amount of material with one or both of the terminal glycidyl radicals in hydrated form.

Still a further group of the polyepoxides comprises the polyepoxide polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. Polyhydric alcohols that may be used for this purpose include glycerol, propylene glycol, ethylene glycol, diethylene glycol, butylene glycol, hexanetriol, sorbitol, mannitol, pentanetriol, pentaerythritol, di- and tri-pentaerythritol, polyglycerol, dulcitol, inositol, carbohydrates, methyltrimethylolpropane, 2,6-octanediol, 1,2,4,5-tetrahydroxycyclohexane, 2-ethylhexanetriol-1,2,6-glycerol methyl ether, glycerol allyl ether, polyvinyl alcohol and polyallyl alcohol, and mixtures thereof. Such polyepoxides may be exemplified by glycerol triglycidyl ether, mannitol tetraglycidyl ether, pentaerythritol tetraglycidyl ether and sorbitol tetraglycidyl ether.

A further group of the polyepoxides comprises the polyepoxide polyesters obtained by esterifying a polycarboxylic acid with an epoxy-containing alcohol, such as, for example, the diglycidyl ester of adipic acid, the diglycidyl ester of malonic acid, and the diglycidyl ester of succinic acid.

A group of polymeric-type polyepoxides comprises the hydroxy-substituted polyepoxide polyethers obtained by reacting, preferably in an alkaline medium, a slight excess, e.g., .5 to 3 mol excess, of a halogen-containing epoxide as described above, with any of the aforedescribed polyhydric phenols, such as resorcinol, catechol, bisphenol, bis[[4 - (2] - hydroxynaphth - 1 - yl)-2-2-hydroxy-naphth-1-yl)]methane and the like.

Coming under special consideration are the polyglycidyl polyethers of polyhydric alcohols obtained by reacting the polyhydric alcohol with epichlorohydrin, preferably in the presence of 0.1% to 5% by weight of an acid-acting compound, such as boron trifluoride, hydrofluoric acid, stannic chloride, or stannic acid. This reaction is effected at about 50° C. to 125° C. with the proportions of reactants being such that there is about one mole of epichlorohydrin for every equivalent of hydroxyl group in the polyhydric alcohol. The resulting chlorohydrin ether is then dehydrochlorinated by heating at about 50° C. to 125° C. with a small, e.g., 10% stoichiometrical excess of a base, such as sodium aluminate.

The products obtained by the method shown in the preceding paragraph are polyether polyepoxide reaction products which in general contain at least three non-cyclic ether (—O—) linkages, terminal epoxide-containing ether

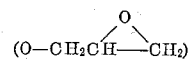

groups, and halogen attached to a carbon of an intermediate

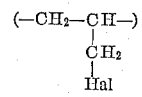

group.

These halogen-containing polyether polyepoxide reaction products, obtainable by partial dehydrohalogenation of polyhalohydrin alcohols may be considered to have the following general formula

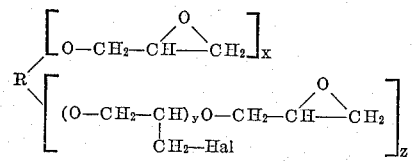

in which R is the residue of the polyhydric alcohol which may contain unreacted hydroxyl groups, X indicates one or more of the epoxy ether groups attached to the alcohol residue, y may be one or may vary in different reaction products of the reaction mixture from zero to more than one, and Z is one or more, and X+Z, in the case of products derived from polyhydric alcohols containing three or more hydroxyl groups averages around two or more so that the reaction product contains on the average two or more than two terminal epoxide groups per molecule.

The internal epoxy group materials referred to above may be exemplified by the epoxidized esters of the polyethylenically unsaturated monocarboxylic acids, such as epoxidized linseed, soyabean, perilla, oiticia, tung, walnut, and dehydrated castor oil, methyl linoleate, butyl linolenate, ethyl 9,12-octadecadienoate, butyl 9,12,15-octadecatrienoate, ethyl elaeostearate, octyl 9,12-octadecadienoate, methyl elaeostearate, monoglycerides of tung oil fatty acids, monoglycerides of soyabean oil, sunflower, rapeseed, hempseed, sardine, cottonseed oil, and the like.

Another group of the internal epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di-(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di(5,6-epoxypentadecyl) tertarate, di(4,5-epoxytetradecyl) maleate, di(2,3-epoxybutyl) azelate, di(2,3-epoxybutyl) citrate, di(5,6-epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-cyclohexanoate, 3,4-epoxycyclohexyl 4,5-epoxyoctanoate, and the like.

Still another group of the epoxy-containing materials include epoxidized derivatives of polyethylenically unsaturated polycarboxylic acids, such as, for example, dimethyl 8,9,12,13-diepoxyeicosanedioate, dibutyl 7,8,11,12-diepoxyoctadecanedioate, diocyl 10,11-diethyl-8,9,12,13-diepoxyeicosanedioate, dihexyl 6,7,10,11 - diepoxyhexadecanedioate, didecyl 9-epoxyethyl-10,11-epoxyoctadecanedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprising the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene-styrene copolymers and the like.

To illustrate the manner in which the invention may be carried out, the following example is given. It is to be understood, however, that the example is for the purpose of illustration and the invention is not to be regarded as limited to any of the specific materials or conditions recited therein. The parts rescribed in the example are by weight.

*Example*

A polyepoxide was prepared by condensing 2,2-bis(4-hydroxyphenyl) propane with epichlorohydrin in a ratio of 1:1.6, in the presence of an aqueous medium kept just colorless to phenolphthalein by the addition of 30% aqueous sodium hydroxide solution. The reaction was stirred and maintained under nitrogen while being heated to 90°–110° C. At the end of the reaction the organic phase was recovered, cooled and treated with successive washes of water, dilute hydrochloric acid, and water. The polyepoxide polyether product was found to have an average molecular weight of 850 and an epoxy equivalent weight of 408.

A series of mixtures of this polyether containing 100 parts of the polyether and 30 parts of phthalic anhydride was prepared. With some of these mixtures were mixed various amounts of an organic sulfur compound.

Each mixture was heated to 120° C. and the viscosity of the mixture determined with a rotating-paddle electrically-driven torsion-type direct-reading viscometer. The time required for each mixture to cure to a viscosity of 1500 centipoises was determined. The times (T) required for the anhydride-organic sulfur compound cured polyepoxides to reach 150 centipoises are compared in the table with those required by the polyepoxides cured with anhydride alone.

| Compound Added | | T in minutes, w/o Sulfur Compd. | Time to 1,500 cp. with Sulfur Accel. | | Reduction in T | |
|---|---|---|---|---|---|---|
| Name | Amt. by Wt., Percent | | Minutes | Percent of T | Minutes | Percent of T |
| Primary octyl mercaptan | 0.1 | 140 | 88 | 63 | 52 | 37 |
| Do | 0.5 | 140 | 43 | 30.6 | 97 | 69.3 |
| Thiophenol | 0.5 | 140 | 87 | 62 | 53 | 38 |
| n-Propyl n-butyl sulfide | 0.1 | 140 | 71 | 50.8 | 69 | 49.2 |
| n-Propyl n-butyl sulfide | 0.5 | 140 | 33 | 23.6 | 107 | 76.4 |
| Isopropyl tertiary-butyl sulfide | 0.1 | 140 | 94 | 67 | 46 | 33 |
| Isopropyl tertiary-butyl sulfide | 0.2 | 140 | 86 | 61.4 | 54 | 38.6 |
| n-Propyl phenyl sulfide | 0.5 | 140 | 51 | 36.4 | 89 | 63.6 |
| di-n-butyl sulfoxide | 0.5 | 140 | 33 | 23.6 | 107 | 76.4 |

We claim as our invention:

1. A process for producing a resinified product which comprises heating at a temperature between 60° C. and 200° C. and reacting simultaneously a polyepoxide having a

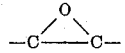

equivalency greater than 1.0, 10% to 80% by weight, based on the polyepoxide, of a polycarboxylic acid anhydride, and 0.02% to 10% by weight, based on the polyepoxide, of an activator selected from the group consisting of hydrogen sulfide, organic compounds containing at least one —SH group, said —SH group being the only reactive group in the molecule, dialkyl sulfides, diaryl sulfides, dialkyl sulfoxides, diaryl sulfoxides, thiophene, thiophthene, thianaphthene and thiophane.

2. A process for producing a resinified product which comprises heating and reacting at temperature between 60° C. and 200° C. and reacting simultaneously a polyepoxide having a

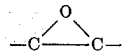

equivalency greater than 1.0, 10% to 80% by weight, based on the polyepoxide, of a polycarboxylic acid anhydride and 0.02% to 5% by weight, based on the polyepoxide of an activator selected from the group consisting of hydrogen sulfide, organic compounds containing at least one —SH group, said —SH group being the only reactive group in the molecule, dialkyl sulfides, diaryl sulfides, dialkyl sulfoxides, diaryl sulfoxides, thiophene, thiophthene, thianaphthene and thiophane.

3. A process as in claim 2, where the activator is hydrogen sulfide.

4. A process as in claim 2, where the activator is an organic compound having at least one thiol radical, said thiol group being the only reactive group in the molecule.

5. A process as in claim 2, where the activator is a dialkyl sulfide.

6. A process as in claim 2, where the activator is a dialkyl sulfoxide.

7. A process as in claim 2 where the activator is a thiophene.

8. A process for hardening a glycidyl polyether of a polyhydric phenol which comprises simultaneously adding and reacting a mixture of a hardening amount of a polycarboxylic acid anhydride hardener and from 1 to 2%, calculated upon the weight of the glycidyl polyether and hardener, of a monomeric organic sulfur compound of the group consisting of organic compounds containing at least one acyclic —SH as the only reactive group,

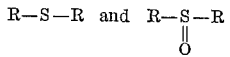

wherein R is hydrocarbon.

References Cited in the file of this patent
UNITED STATES PATENTS 2,633,458    Shokal _____ Mar. 31, 1953
2,831,830    Schroeder _____ Apr. 22, 1958